(12) United States Patent
Chen

(10) Patent No.: US 10,192,149 B1
(45) Date of Patent: Jan. 29, 2019

(54) REMOTE EDITING CARD PRINTING SYSTEM BY USING MOBILE HANDSETS

(71) Applicant: Yi-Ming Chen, Taipei (TW)

(72) Inventor: Yi-Ming Chen, Taipei (TW)

( * ) Notice: Subject to any disclaimer, the term of this patent is extended or adjusted under 35 U.S.C. 154(b) by 0 days.

(21) Appl. No.: 15/880,501

(22) Filed: Jan. 25, 2018

(51) Int. Cl.
*G06F 15/00* (2006.01)
*G06F 3/12* (2006.01)
*G06K 1/00* (2006.01)
*G06K 15/00* (2006.01)
*G06K 15/02* (2006.01)

(52) U.S. Cl.
CPC ....... *G06K 15/007* (2013.01); *G06K 15/1805* (2013.01); *G06K 15/1809* (2013.01); *G06K 15/1835* (2013.01)

(58) Field of Classification Search
CPC ............. G06K 15/007; G06K 15/1805; G06K 15/1809; G06K 15/1835
USPC ....................................... 358/1.13, 1.1, 1.15
See application file for complete search history.

(56) References Cited

U.S. PATENT DOCUMENTS

2014/0201624 A1* 7/2014 Clark .................... G06F 17/248
715/243
2017/0364721 A1* 12/2017 Yeakley ............. G06K 7/10237

* cited by examiner

*Primary Examiner* — Douglas Tran

(57) ABSTRACT

A remote editing card printing system by using mobile handsets includes a card printer for printing cards having a specific size. The card printer includes a transformer for transferring instructions into machine codes for instructing a printing unit of the card printer to print cards with predetermine drawings or texts on cards; A layout editor installed on the electronic computer device; the layout editor causing a user to input printing instructions or layout instructions through an I/O device of the electronic computer device to edit a layout of a card and thus causing the printing unit to print the cards based on the layout and printing instructions. The layout editor may be installed on an electronic computer device or a cloud device, and an APP is installed on a handset to be connected to the layout editor so that a user may edit the instructions directly on the APP, or the layout editor is installed on the handset directly.

7 Claims, 4 Drawing Sheets

REMOTE EDITING CARD PRINTING SYSTEM BY USING MOBILE HANDSETS

FIELD OF INVENTION

The present invention relates to card printers, and in particular to a remote editing card printing system with data and instruction transmitted via mobile handsets.

BACKGROUND OF INVENTION

In the prior art, a card printer serves for printing cards which have a specific size. The cards may be, for example, a name card, a debit card, or other electronic cards, which have specific formats and size. The card printer includes a transformer for transferring instructions into machine codes for instructing a printing unit of the card printer to print cards with desired drawings or texts on the card; and a transceiver for signally connecting with a succeeding electronic computer device or a cloud device. The electronic computer device is for example, a computer or a notebook computer.

In generally, a layout editor is installed on the electronic computer device. When the layout editor is installed on the electronic computer device, a user may operate the layout editor through an I/O device (input/output device) for inputting printing instructions or layout instructions so as to edit a layout of a card and printing the cards based on the printing instructions. The layout instructions and printing instructions are transferred to the card printer through the transceiver of the electronic computer device. The transceiver of the card printer will receive these instructions and then transfers these instructions to the transformer of the card printer so as to transfer the instructions into codes acceptable by the printing unit.

However, in above mentioned prior art card printer, the operator is located in a fixed position which has the electronic computer device or the user must carry a computer or a notebook computer, but this is inconvenient. However, as we know that the handsets are well known and widely carried by people and thus inventor of the present invention desires to improve the prior art defect in operation of a card printer by using the function of a handset.

SUMMARY OF THE INVENTION

To improve above defects in the prior art, the present invention provides a remote editing card printing system, wherein edition of the layout instructions and printing instructions originally edited by the layout editor in the electronic computer device or in the cloud device is transferred to the APP in the handset. Therefore, a user may edit these instructions in a far end. Therefore, the user's operation is not limited to the position locating the electronic computer device or an JO device which is connected to the cloud device. However, a handset is easily portable and is carried by any person. Therefore, it is not confined by spaces and times.

Or the instructions and printing instructions originally edited through the electronic computer device are now edited on the handset by using the APP within the handset. No electronic computer device is used. Thus a user may edit desired instructions for printing cards on the card printer at any space and time without being limited by the location of the electronic computer device. The user is unnecessary to carry a computer or a notebook computer. It is necessary for a user to carry a computer or a notebook computer.

To achieve above object, the present invention provides a remote editing card printing system, comprising: a card printer for printing cards having a specific size; comprising: a transformer for transferring instructions into machine codes for instructing a printing unit of the card printer to print cards with predetermine drawings or texts on cards; a transceiver signally connected with an electronic computer device. Furthermore, a layout editor installed on the electronic computer device causes a user to input printing instructions or layout instructions through an I/O device of the electronic computer device to edit a layout of a card and thus causing the printing unit to print the cards based on the layout and printing instructions; wherein the layout instructions and printing instructions is transferred to the card printer through the transceiver of the electronic computer device; the transceiver of the card printer will receive these instructions and then transfers these instructions to the transformer of the card printer so as to transfer the instructions into codes acceptable by the printing unit. A handset end application program (APP) built is in a handset. The APP being connected to the electronic computer device through a transceiver of the handset. The transceiver of the handset is connected to the electronic computer device through a wireless network. The APP provides functions causing that a user can input layout instructions or printing instructions of cards from the I/O device of the handset; the layout instructions and printing instructions are transferred from the transceiver of handset to the transceiver of the electronic computer device through the network and then transferred to the layout editor therein; and then the layout editor transfers the instructions to transformer of the card printer so as to transfer the instructions into the codes which are acceptable by the printing unit of the card printer for print the cards according to the layout instructions and the printing instructions.

Furthermore, the present invention provides a remote editing card printing system, comprising: a card printer for printing cards having a specific size; comprising: a transformer for transferring instructions into machine codes for instructing a printing unit of the card printer to print cards with predetermine drawings or texts on cards; a transceiver signally connected with an electronic computer device; the electronic computer device. Furthermore, a layout editor is installed on a cloud device; the layout editor causing a user to input printing instructions or layout instructions through an I/O device of an electronic computer device connected to the cloud device so as to edit a layout of a card and thus causing the printing unit to print the cards based on the layout and printing instructions; wherein the layout instructions and printing instructions is transferred to the card printer through the transceiver of the cloud device; the transceiver of the card printer will receive these instructions and then transfers these instructions to the transformer of the card printer so as to transfer the instructions into codes acceptable by the printing unit. A handset end application program (APP) is built in a handset; the APP being connected to the cloud device through a transceiver of the handset. The transceiver of the handset is connected to the cloud device through a wireless network. The APP provides functions causes that a user can input layout instructions or printing instructions of cards from the I/O device of the handset. The layout instructions and printing instructions are transferred from the transceiver of handset to the transceiver of the cloud device through the network and then transferred to the layout editor therein; and then the layout editor transfers the instructions to transformer of the card printer so as to transfer the instructions into the codes which are acceptable by the printing unit of the card printer for print the cards according to the layout instructions and the printing instructions.

Moreover, the present invention provides a remote editing card printing system, comprising: a card printer for printing cards having a specific size; comprising: a transformer for transferring instructions into machine codes for instructing a printing unit of the card printer to print cards with predetermined drawings or texts on cards; a transceiver signally connected with an electronic computer device; the electronic computer device. Furthermore, a layout editor having a form of an application program of a handset is installed in a handset; the layout editor causing the user can input layout instructions and printing instructions from an I/O device of the handset. The layout instructions and printing instructions are transferred to the card printer through the transceiver of the handset; and then the transformer within the card printer will transfer these instructions into codes which are acceptable by the printing unit so as to print desired drawings or texts on cards according to these instructions.

DETAILED DESCRIPTION OF THE INVENTION

Figure 1:
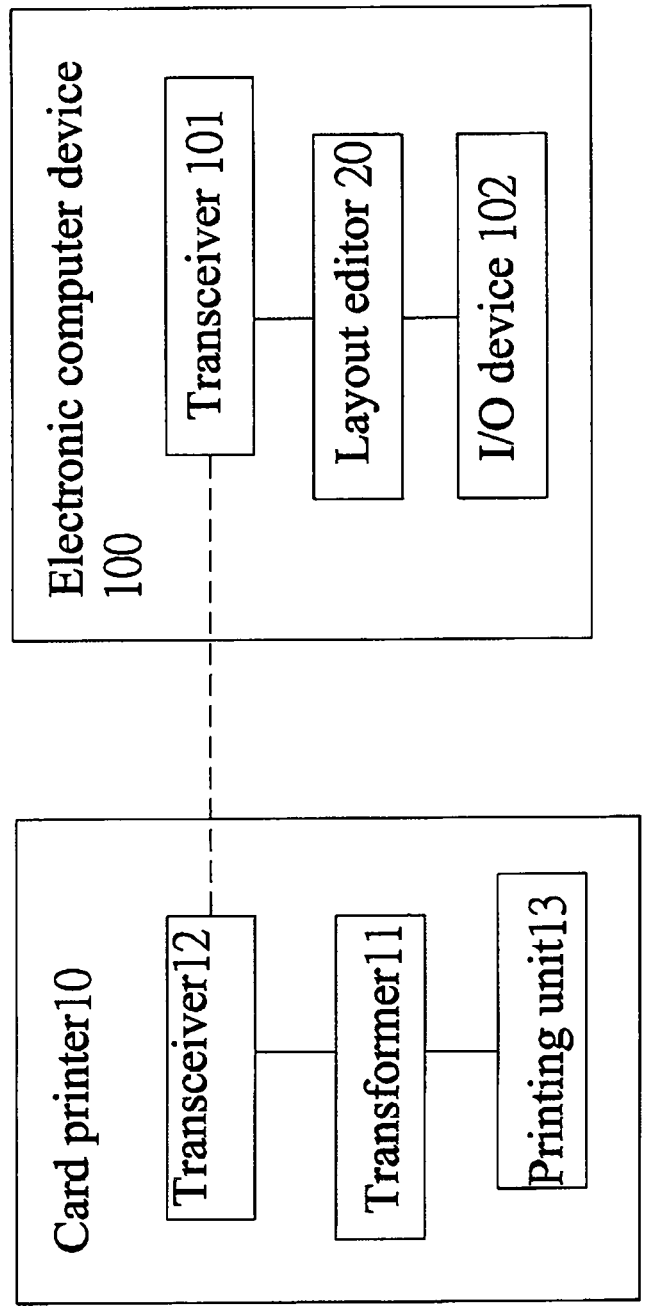
FIG. 1 is a schematic view showing a prior art card printing system.
Figure 2:
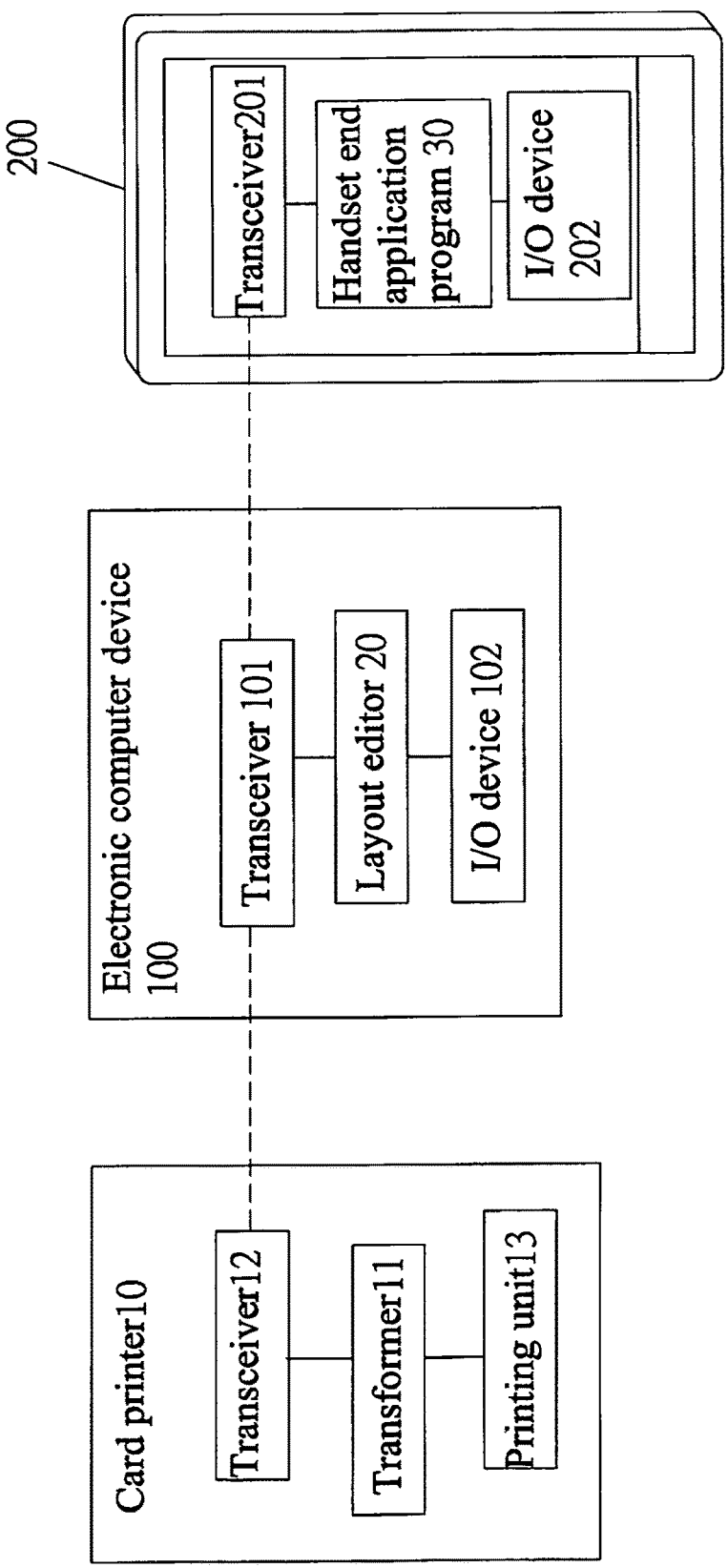
FIG. 2 is a structural block diagram showing the function block diagram of the first embodiment of the present invention
Figure 3:
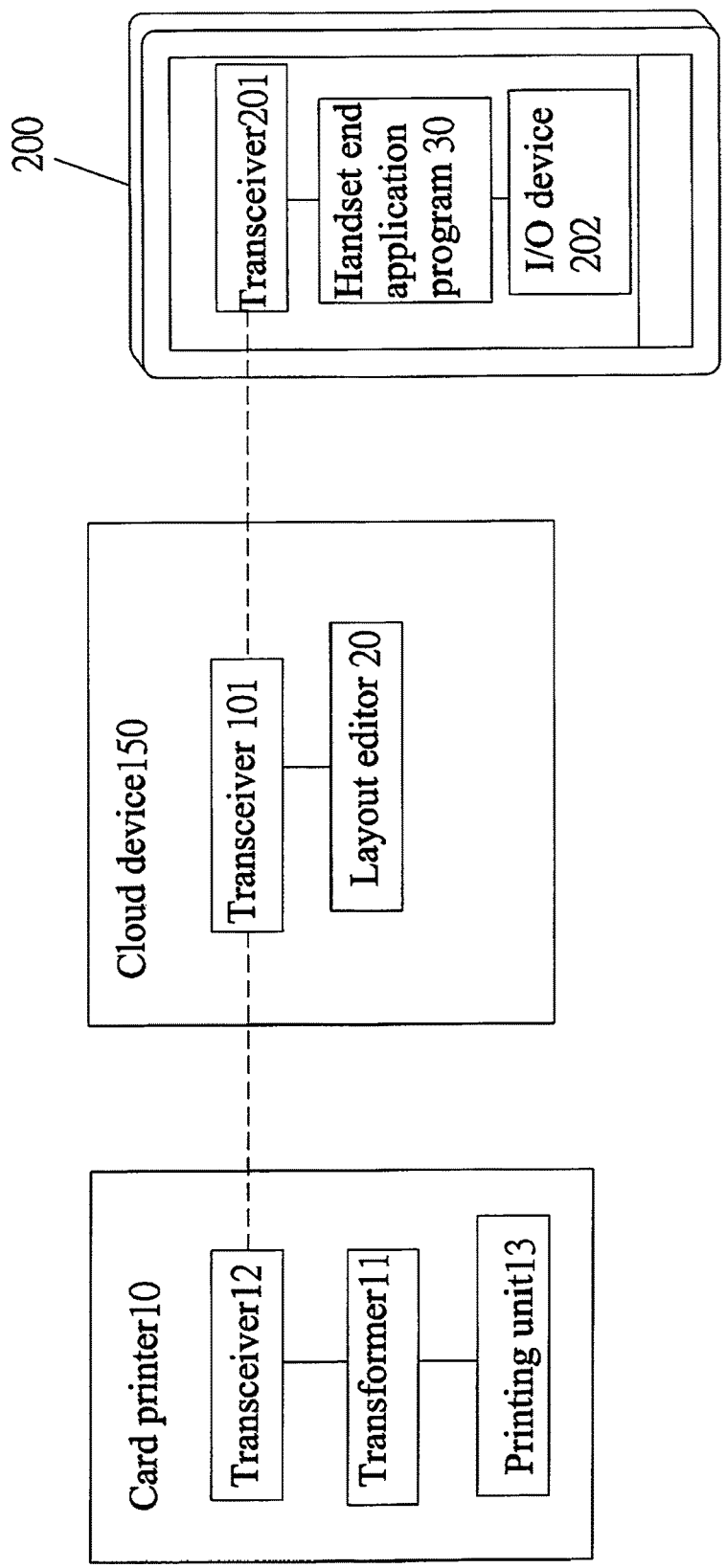
FIG. 3 shows another example for the diagram illustrated in FIG. 2.

With reference to FIGS. 2 and 3, the first embodiment about a card printing system with a function of remote edition is illustrated. The present invention includes the following elements.

A card printer 10, as illustrated in FIG. 2, serves for printing cards which have a specific size. The cards may be, for example, a name card, a debit card, or other electronic cards, which have specific formats and size.

The card printer 10 includes the following elements.

A transformer 11 serves for transferring instructions into machine codes for instructing a printing unit 13 of the card printer 10 to print cards with desired drawings or texts on the card.

A transceiver 12 serves to signally connect with a succeeding electronic computer device 100 (as illustrated in FIG. 2) or a cloud device 150 (as illustrated in FIG. 3). The electronic computer device 100 is for example, a computer or a notebook computer.

A layout editor 20 is installed on the electronic computer device 100 or a cloud device 150. When the layout editor 20 is installed on the electronic computer device 100, a user may operate the layout editor 20 through an I/O device 102 (input/output device) for inputting printing instructions or layout instructions so as to edit a layout of a card and printing the cards based on the printing instructions.

If the layout editor 20 is installed on a cloud device 150, the user must connect to the layout editor 20 through an electronic computer device 100 for editing layout instructions and printing instructions.

The layout instructions and printing instructions are transferred to the card printer 10 through the transceiver 101 of the electronic computer device 100 or the cloud device 150. The transceiver 12 of the card printer 10 will receive these instructions and then transfers these instructions to the transformer 11 of the card printer 10 so as to transfer the instructions into codes acceptable by the printing unit 13.

A handset end application program 30 (APP) is built in a handset 200. The APP 30 may be downloaded to the handset 200. The APP 30 is connected to the electronic computer device 100 or the cloud device 150 through a transceiver 201 of the handset 200. The transceiver 201 of the handset 200 is connected to the electronic computer device 100 or the cloud device 150 through a wireless network which may be Wi-Fi, NFC, blue tooth, 3G, 4G, and 5G, etc.

The APP provides functions which cause that a user may input layout instructions or printing instructions of cards from the I/O device 202 of the handset 200. The layout instructions and printing instructions are transferred from the transceiver 202 of handset 200 to the transceiver 101 of the electronic computer device 100 or cloud device 150 through the network and then transferred to the layout editor 20 therein.

Then the layout editor 20 transfers the instructions to transformer 11 of the card printer 10 so as to transfer the instructions into the codes which are acceptable by the printing unit 13 of the card printer 10 for print the cards according to the layout instructions and the printing instructions.

In the present invention, edition of the layout instructions and printing instructions originally edited by the layout editor 20 in the electronic computer device 100 or in the cloud device 150 is transferred to the APP 30 in the handset 200. Therefore, a user may edit these instructions in a far end. Therefore, the user's operation is not limited to the position locating the electronic computer device 100 or an JO device which is connected to the cloud device 150. However, a handset is easily portable and is carried by any person. Therefore, it is not confined by spaces and times.

Figure 4:
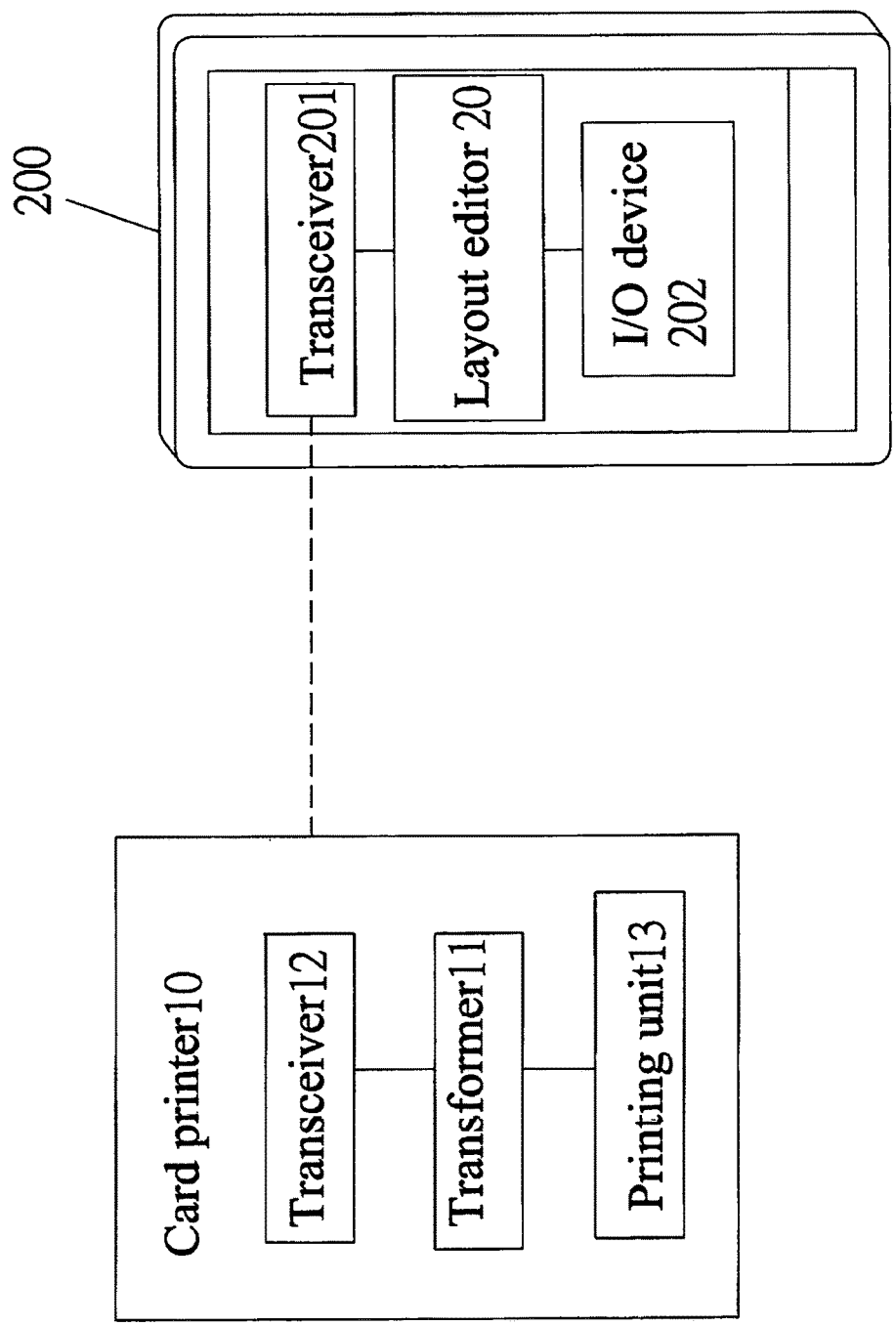
FIG. 4 is a structural block diagram showing the function block diagram of the second embodiment of the present invention.

FIG. 4 shows the second embodiment of embodiment. In this embodiment, the function of the card printer 10 is identical to those described in above embodiment, and thus the details thereof will not be further described herein. Only those difference therebetween is disclosed.

A layout editor 20 having a form of an application program of a handset is installed in a handset 200. The layout editor 20 causes the user can input layout instructions and printing instructions from an I/O device 202 of the handset 200.

The layout instructions and printing instructions are transferred to the card printer 10 through the transceiver 202 of the handset 200. Then the transformer 11 within the card printer 10 will transfer these instructions into codes which are acceptable by the printing unit 13 so as to print desired drawings or texts on cards according to these instructions.

In this embodiment, the layout instructions and printing instructions originally edited through the electronic computer device 100 are now edited on the handset 200 by using the APP 30 within the handset 200. No electronic computer device 100 is used. Thus a user may edit desired instructions for printing cards on the card printer 10 at any space and time without being limited by the location of the electronic computer device 100. The user is unnecessary to carry a computer or a notebook computer.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A remote editing card printing system by using mobile handsets, comprising:
   a card printer for printing cards having a specific size; comprising:
      a transformer for transferring instructions into machine codes for instructing a printing unit of the card printer to print cards with predetermine drawings or texts on cards;
      a transceiver signally connected with an electronic computer device;
   a layout editor installed on the electronic computer device; the layout editor causing a user to input printing instructions or layout instructions through an I/O device of the electronic computer device to edit a layout of a card and thus causing the printing unit to print the cards based on the layout and printing instructions; wherein the layout instructions and printing instructions is transferred to the card printer through the transceiver of the electronic computer device; the transceiver of the card printer will receive these instructions and then transfers these instructions to the transformer of the card printer so as to transfer the instructions into codes acceptable by the printing unit;
   a handset end application program (APP) built in a handset; the APP being connected to the electronic computer device through a transceiver of the handset; the transceiver of the handset being connected to the electronic computer device through a wireless network;
   wherein the APP provides functions causing that a user can input layout instructions or printing instructions of cards from the I/O device of the handset; the layout instructions and printing instructions are transferred from the transceiver of handset to the transceiver of the electronic computer device through the network and then transferred to the layout editor therein; and then the layout editor transfers the instructions to transformer of the card printer so as to transfer the instructions into the codes which are acceptable by the printing unit of the card printer for print the cards according to the layout instructions and the printing instructions.

2. The remote editing card printing system by using mobile handsets as claimed in claim 1, wherein the card is selected from a name card, a debit card, and electronic cards which have specific formats and size.

3. The remote editing card printing system by using mobile handsets as claimed in claim 1, wherein the electronic computer device is selected from a computer, a flat computer and a notebook computer.

4. A remote editing card printing system by using mobile handsets, comprising:
   a card printer for printing cards having a specific size; comprising:
      a transformer for transferring instructions into machine codes for instructing a printing unit of the card printer to print cards with predetermine drawings or texts on cards;
      a transceiver signally connected with an electronic computer device;
   a layout editor installed on a cloud device; the layout editor causing a user to input printing instructions or layout instructions through an I/O device of an electronic computer device connected to the cloud device so as to edit a layout of a card and thus causing the printing unit to print the cards based on the layout and printing instructions; wherein the layout instructions and printing instructions is transferred to the card printer through the transceiver of the cloud device; the transceiver of the card printer will receive these instructions and then transfers these instructions to the transformer of the card printer so as to transfer the instructions into codes acceptable by the printing unit;
   a handset end application program (APP) built in a handset; the APP being connected to the cloud device through a transceiver of the handset; the transceiver of the handset being connected to the cloud device through a wireless network;
   wherein the APP provides functions causing that a user can input layout instructions or printing instructions of cards from the I/O device of the handset; the layout instructions and printing instructions are transferred from the transceiver of handset to the transceiver of the cloud device through the network and then transferred to the layout editor therein; and then the layout editor transfers the instructions to transformer of the card printer so as to transfer the instructions into the codes which are acceptable by the printing unit of the card printer for print the cards according to the layout instructions and the printing instructions.

5. The remote editing card printing system by using mobile handsets as claimed in claim 4, wherein the card is selected from a name card, a debit card, and electronic cards which have specific formats and size.

6. A remote editing card printing system by using mobile handsets, comprising:
   a card printer for printing cards having a specific size; comprising:
      a transformer for transferring instructions into machine codes for instructing a printing unit of the card printer to print cards with predetermine drawings or texts on cards;
      a transceiver signally connected with an electronic computer device;
   a layout editor having a form of an application program of a handset being installed in a handset; the layout editor causing the user can input layout instructions and printing instructions from an I/O device of the handset;
   wherein the layout instructions and printing instructions are transferred to the card printer through the transceiver of the handset; and then the transformer within the card printer will transfer these instructions into codes which are acceptable by the printing unit so as to print desired drawings or texts on cards according to these instructions.

7. The remote editing card printing system by using mobile handsets as claimed in claim 6, wherein the card is selected from a name card, a debit card, and electronic cards which have specific formats and size.

* * * * *